(12) United States Patent
Howie et al.

(10) Patent No.: US 6,736,520 B2
(45) Date of Patent: May 18, 2004

(54) FORWARD VIEWING MIRROR ASSEMBLY

(76) Inventors: Douglas Anthony Howie, 19 Oakmeadow Boulevard, Keswick, Ontario (CA), L4P 3L1; Christopher Michael Howie, 612 Queen Street, Newmarket, Ontario (CA), L3Y 2H9; James Hubert Howie, 9 Morningside Avenue, Suite 203, Toronto, Ontario (CA), M6S 1C1

( * ) Notice: Subject to any disclaimer, the term of this patent is extended or adjusted under 35 U.S.C. 154(b) by 0 days.

(21) Appl. No.: 09/861,988

(22) Filed: May 17, 2001

(65) Prior Publication Data

US 2002/0048098 A1 Apr. 25, 2002

(51) Int. Cl.[7] .................................................. G02B 5/08
(52) U.S. Cl. ....................................................... 359/857
(58) Field of Search .................................. 359/857, 862

(56) References Cited

U.S. PATENT DOCUMENTS

| | | |
|---|---|---|
| 4,685,779 A | 8/1987 | Gonzalez |
| 4,728,180 A | 3/1988 | Janowicz |
| 5,001,966 A * | 3/1991 | McIntyre et al. ......... 15/250.04 |
| 5,280,391 A | 1/1994 | Peinovich |
| 5,424,875 A | 6/1995 | Davis, II |
| 5,589,991 A | 12/1996 | Bleier |
| 5,644,443 A | 7/1997 | Hung |
| 5,790,328 A | 8/1998 | Strauss et al. |
| 6,012,819 A | 1/2000 | Pai |
| 6,247,821 B1 * | 6/2001 | Brewster ..................... 359/841 |

FOREIGN PATENT DOCUMENTS

EP  0 687 592 A1 * 12/1995  ............. B60R/1/10

* cited by examiner

Primary Examiner—Euncha Cherry

(57) ABSTRACT

A forward looking mirror device is disclosed which is useful for vehicles having side mounted rear view mirrors. The forward looking mirror device consists of first and second mirrors which are pivotally mounted in a housing, the first mirror moveable to collect an image from the front of the vehicle and the second mirror moveable to reflect the image from the first mirror to the driver. The first and second mirrors are mounted adjacent the rear view mirror of the vehicle. The second mirror is separated from the rear view mirror by a distance which is pre-selected to prevent the driver from focussing on both the rear view mirror and the second mirror simultaneously. The mirror assembly is mounted to the vehicle by adjustable arms, the length of said arms being adjustable to position the second mirror at the driver's eye level.

7 Claims, 8 Drawing Sheets

Fig #3

FORWARD VIEWING MIRROR ASSEMBLY

FIELD OF THE INVENTION

The invention relates generally to reflective mirror assemblies which give the driver an enlarged visual field.

BACKGROUND OF THE INVENTION

The number of large transport trucks on the highways have increased and truck drivers now routinely operate their vehicles for extended periods of times and for thousands if not millions of miles. Due to the number of trucks on the highways, the issue of truck safety has become more significant. Driver visibility is a key aspect of truck safety. Unfortunately, due to the size of most commercial vehicles, vehicle operators often have restricted fields of vision. This is particularly the case when a truck driver is traveling behind a truck trailer or other commercial vehicle. Given the size of the truck trailer, the driver in the truck immediately behind the trailer has a very restricted field of vision and cannot see what the traffic conditions are like ahead. As a result the driver has less time to respond to changing traffic conditions. In order to view the upcoming traffic conditions, the driver of the vehicle behind the trailer must move his vehicle to the left or right in order to view around the trailer in front of him. Because the trailer can be so wide, the vehicle driver must sometimes travel so far into the left or right lane that the lane is obstructed by his vehicle. Where the vehicle operator is following a trailer in a single lane highway, then the vehicle operator must travel into the oncoming lane in order to view around the trailer he is following.

Forward viewing mirror assemblies have been introduced in order to expand a vehicle operator's field of view. These forward viewing mirror assemblies generally comprise a first mirror which is positioned to collect light from the front of the vehicle and a second mirror positioned relative to the first mirror to present the view from the first mirror to the driver. These mirror assemblies are often attached to the side of the vehicle thereby permitting a driver to have an extended field of view.

Unfortunately, existing forward viewing mirror assemblies are quite restricted in their use due to a variety of factors. Firstly, existing forward viewing mirror assemblies generally cannot operate effectively with existing rearview mirrors. Existing front view mirror assemblies can lead to eye fatigue and even driver confusion if they are combined with standard rearview mirrors. Furthermore, existing forward viewing mirror assemblies are quite restrictive in how they can be mounted thereby greatly decreasing their effectiveness. As a result, existing forward viewing mirror assemblies have not gained market acceptance, and there is a continuing need for an improved forward looking mirror assembly which can effectively be applied to existing motor vehicles.

SUMMARY OF THE INVENTION

The invention provides a forward-looking mirror assembly for use on a vehicle, such as a truck, that has a rear view mirror supported by a U-shaped yoke. The mirror includes a forward-looking mirror mounted to the support to gather an image forward of the vehicle, a viewing mirror mounted to the support to reflect that image, and mounting means for mounting the support together with the mirrors to the yoke. The mounting means include adjustment means for adjusting the position of the support relative to the yoke thereby to position the viewing mirror relative to the level of the driver's eyes. The adjustment means preferably include an adjustable arm that extends between the yoke and the support.

BRIEF DESCRIPTION OF THE DRAWINGS

FIG. 6 is a rear view of an alternate embodiment of the forward viewing mirror assembly.

DETAILED DESCRIPTION OF THE INVENTION

Figure 1:
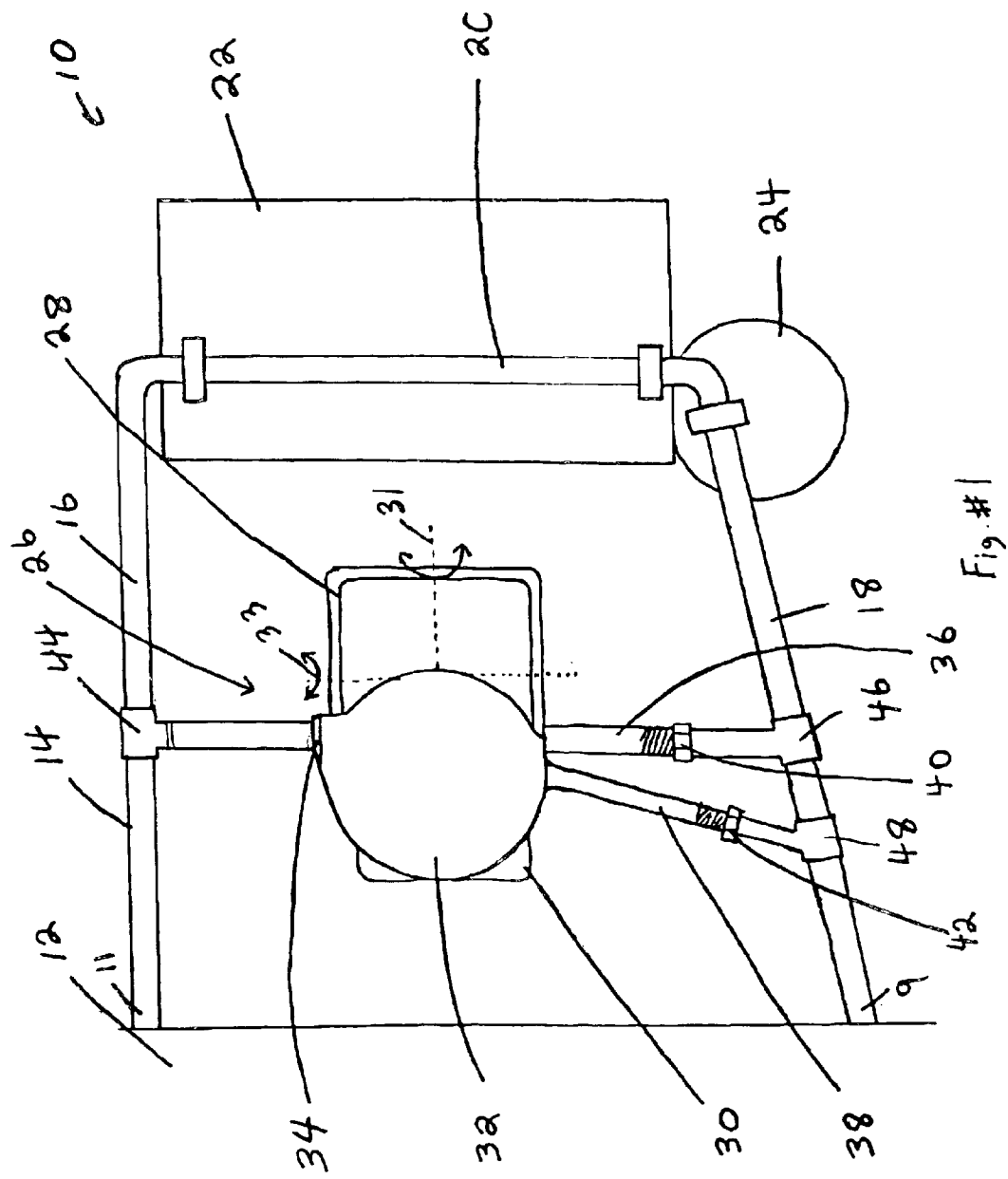
FIG. 1 is a front view of the preferred embodiment of the forward viewing mirror assembly made in accordance with the present invention.
Figure 4:
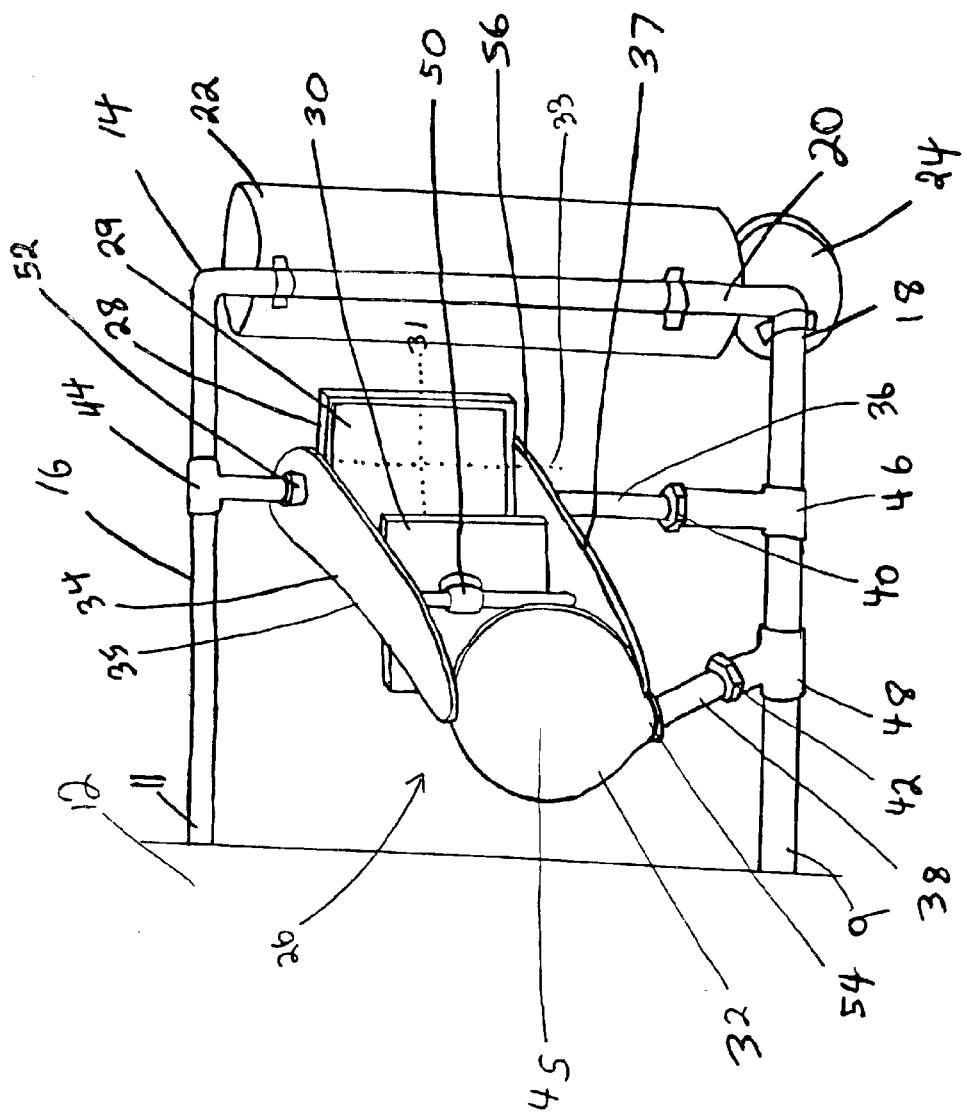
FIG. 4 is a perspective view of the forward viewing mirror assembly made in accordance with the present invention.

Referring firstly to FIGS. 1 and 4, commercial vehicles such as buses, school buses, and transport trucks are provided with rear view mirrors on both the driver and passenger side. In some cases, the rear view mirrors of these vehicles are attached to the vehicle by a single elongated arm. In most cases involving transport trucks, however, the rear view mirror is attached by a u-shaped yoke. Rear view mirrors 22 and 24 are generally connected to truck cabin 12 by attachment to a U shaped bracket (yoke) 14. Yoke 14 generally consists of an upper arm 16, a side arm 20 and a lower arm 18. End 11 of upper arm 14 and end 9 of lower arm 18 are generally connected to truck body 12 by means of bolts or the like. Arms 16 and 18 are sufficiently long so that arm 20 extends a significant distance from truck cabin 12. The distance between arm 20 and cabin 12 is significant and should be at least as great as the amount by which the trailer (not shown) extends beyond the side of truck cabin 12. If arm 20 does not extend far enough away from truck cabin 12, then the rear view mirror 22 attached to arm 20 will not give an unobstructed view of the traffic conditions behind the trailer.

The forward looking mirror assembly made in accordance with the present invention, shown generally as item 26, consists of support 34, wind screen 32, viewing mirror 30, forward looking mirror 28 and positioning arms 38 and 36. Wind screen 32, viewing mirror 30 and forward looking mirror 28 are all mounted to support 34. Support 34 is in turn mounted to bracket 14 by adjustable positioning arms 36 and 38. Mirror assembly 26 is positioned within bracket 14 such that viewing mirror 30 is between truck cabin 12 and rear view mirror 22. Forward looking mirror 28 has a horizontal axis 31 and a vertical axis 33. Mirror 28 is pivotally connected to positioning arm 36 such that mirror 28 can be pivoted relative to both axis 31 and 33.

Figure 2:
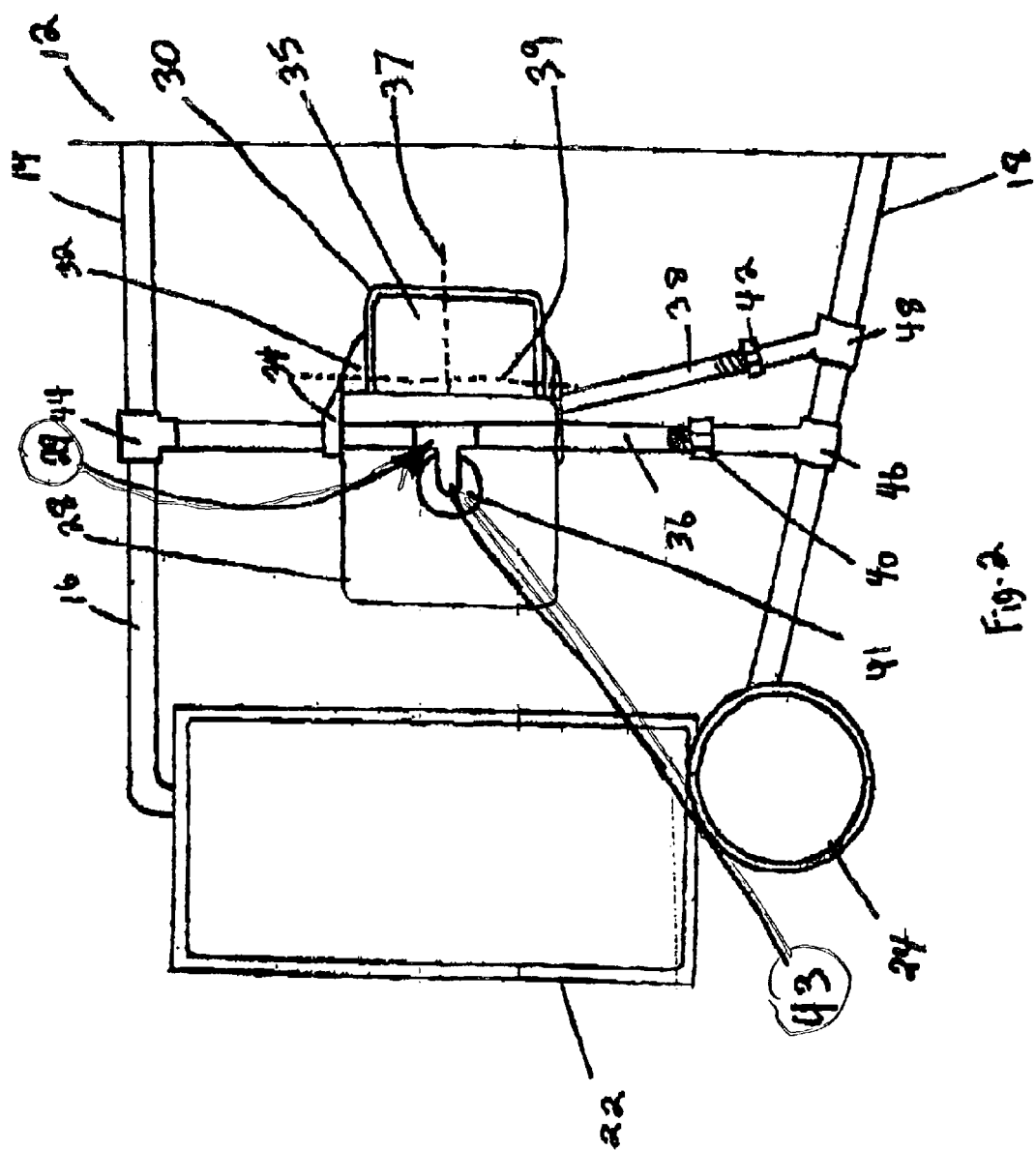
FIG. 2 is a rear view of the forward looking mirror assembly made in accordance with the present invention.

Referring now to FIG. 2, viewing mirror 30 is positioned approximately mid way between truck cabin 12 and rear view mirror 22. It has been discovered that if the driver can focus on both viewing mirror 30 and rear view mirror 22 simultaneously, then the driver sitting in cabin 12 will be confused when looking at either viewing mirror 30 or rear view mirror 22 since the images from both mirrors may be similar. As a result, the driver may forget which mirror is which and may accidentally take an image from the wrong mirror. By taking an image from the wrong mirror, the driver may execute a wrong lane change or other maneuver, thereby causing an accident. To overcome this problem, the distance between mirror 30 and rear view mirror 22 is selected to ensure that a driver located in cabin 12 can not focus on both the rear view mirror and the viewing mirror simultaneously. Preferably, the distance between rear view mirror 22 and viewing mirror 30 is selected so that the driver must move his eyes from one mirror to the other in order to focus on the image contained in the respective mirrors. The minimum required distance between rear view mirror 22 and viewing mirror 30 is a function of the length of arms 16 and 18 since the further these mirrors are away from the driver, the greater the distance separating the mirrors will be required. It has been discovered that for most practical applications involving transport trucks, a minimum distance of at least 4 inches (10 centimeters) is required between viewing mirror 30 and rear view mirror 22. Again, for most transport trucks, if viewing mirror 30 and rear view mirror 22 are less than 4 inches (10 centimeters) apart, then the driver looking at the forward viewing mirror would see a portion of rear view mirror 22 and confusion between the images contained in the two mirrors is likely to occur. If rear view mirror 22 and viewing mirror 30 are at least 4 inches (10 centimeters) apart, then the driver will have to move his or her eyes from one mirror to the other in order to view the image in the respective mirrors. Of course, the closer mirror 22 is to mirror 30, the easier it will be for the driver to look from one image to the other; therefore, it is important to adjust the spacing of the two mirrors to ensure optimum performance. Preferably, mirrors 22 and 30 are sufficiently close to each other such that the driver has to look in the same general direction to view either mirror.

The vertical position of viewing mirror 30 is also critical since it must be at the same approximate level as the driver's eyes. If mirror 30 is positioned too high or too low, then the driver located in cabin 12 will have to spend a significant amount of time searching for the image in the mirror. Furthermore, since rear view mirrors 22 and 24 are both also present on bracket 14, there is a possibility that the driver may be confused and accidently take an image from one of the rear view mirrors. To ensure that this confusion does not arise, and to ensure that the driver has quick and easy access to the image reflected on viewing mirror 30, adjustable positioning arms 36 and 38 position mirror 30 such that horizontal axis 37 of the viewing mirror is substantially at the same level as to the driver's eyes. Adjustable arms 36 and 38 are preferably telescoping arms whose lengths can be either lengthened or shortened by turning bolts 40 and 42 respectively. Therefore, the lengths of positioning arms 36 and 38 can be adjusted to exactly position mirror 30 for each driver's eye level. As see in FIG. 2, positioning arm 36 is provided with attachment means 44 and 46 located at the ends of arm 36 for attaching the arm to upper members 16 and 18, respectively, of bracket 14. Forward looking mirror 28 is mounted to arm 36 via mounting mechanism 29. Mounting mechanism 29 comprises a pivotal joint having projection 43 and recessed member 41. Members 43 and 41 form a ball and socket attachment which permits forward looking mirror 28 to be pivoted in several different directions along axis 33 and 31.

Figure 3:
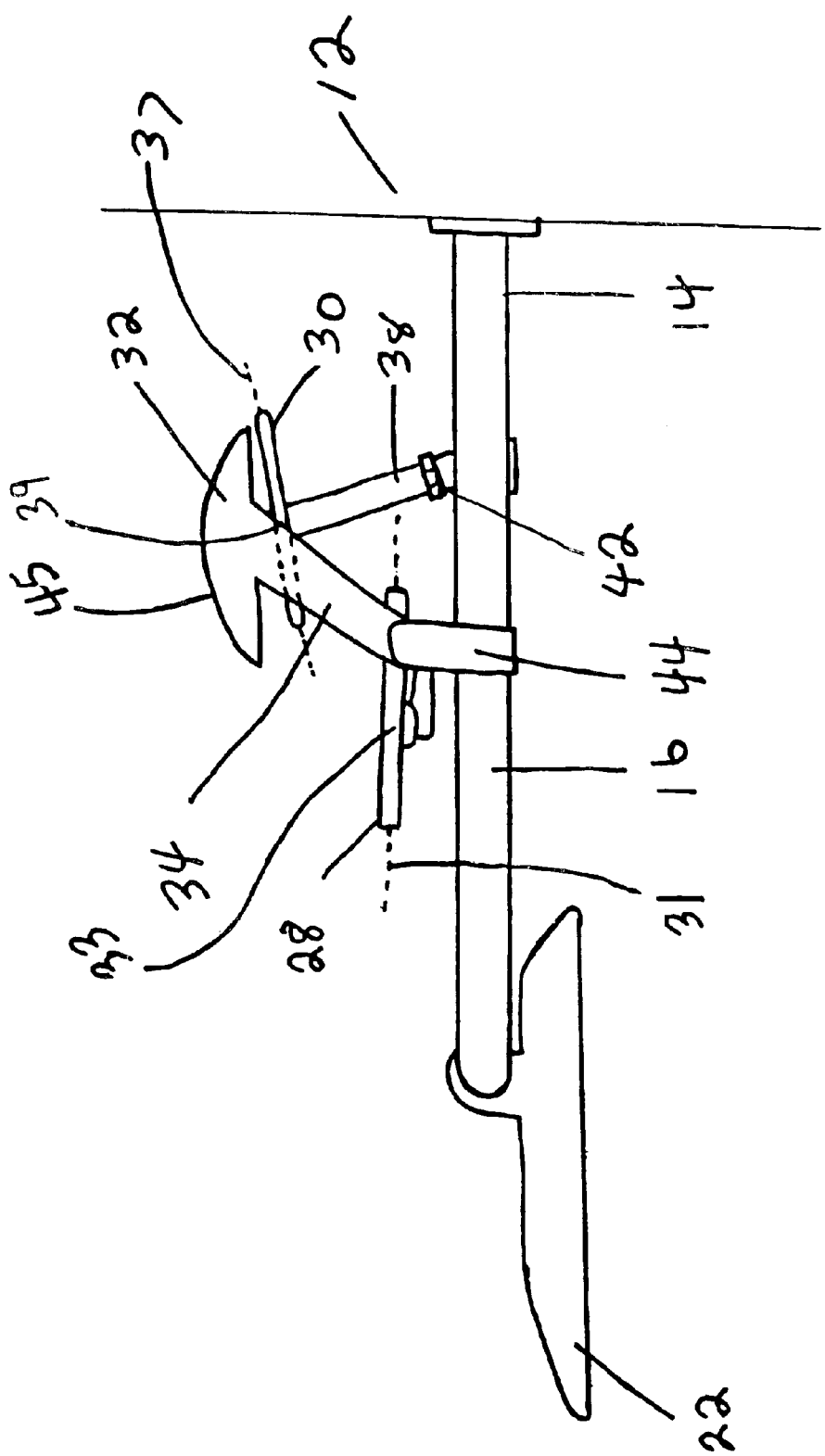
FIG. 3 is a top view of the forward viewing mirror assembly made in accordance with the present invention.

Referring now to FIG. 3, forward looking mirror 28 and viewing mirror 30 can both be pivoted at a variety of angles. Preferably, viewing mirror 30 can be pivoted approximately 320° relative to either axis 37 and 39, thereby permitting the viewing mirror to provide a variety of images. When the assembly is used as a forward looking mirror assembly, forward looking mirror 28 is positioned such that it gathers an image from the front of truck 12 and reflects that image into viewing mirror 30. Viewing mirror 30 is in turn angled to collect the image from mirror 28 and reflect it to the driver located in cabin 12. Since forward looking mirror 28 extends some distance outside of cabin 12, the net effect of the mirror assembly is to permit the driver located in cabin 12 to observe the traffic conditions from the point of view of forward looking mirror 28. The drivers horizontal view can be extended by simply pivoting forward looking mirrors 28 and 30 relative to vertical axis 33 and 39 respectively. In addition, by tilting mirrors 30 and 28 relative to horizontal axis 37 and 31 respectively, the driver may also extend his vertical field of view thereby permitting him to view the road conditions immediately in front of, below and to the side of truck cabin 12. This is particularly useful when the truck driver is trying to maneuver the truck into parking or docking locations where little room is available to maneuver. Furthermore, by tilting mirrors 30 and 28 relative to axis 37 and 31 respectively, the driver may also obtain a view of the conditions immediately above, in front of and to the side of cabin 12. This is useful when the driver is trying to maneuver the truck under a bridge or other overhanging structure where there is a concern that a portion of the truck may contact the overhanging structure. Finally, by positioning mirror 28 so that it does not reflect an image into mirror 30, mirror 30 may also be used as a rearview mirror with a different point of view relative to rear view mirror 22. This would permit the driver to gather additional information concerning the conditions immediately behind and to the side of truck cabin 12. Since mirror 30 can be pivoted relative to axis 37, viewing mirror 30 can be used as a rear view mirror which gathers information from either above or below truck cabin 12, again providing the driver with additional information to help him or her maneuver a vehicle. Wind screen 32 is positioned in front of mirror 30 and has a curved surface 45 which is configured to deflect wind away from mirrors 30 and 28. It will be appreciated that given the extreme angles that mirrors 28 and 30 can be tilted to, wind screen 32 prevents the mirrors from changing position as a result of wind pressure. In addition, wind screen 32 prevents mud, rain or snow from obscuring mirrors 30 and 28.

Figure 5:
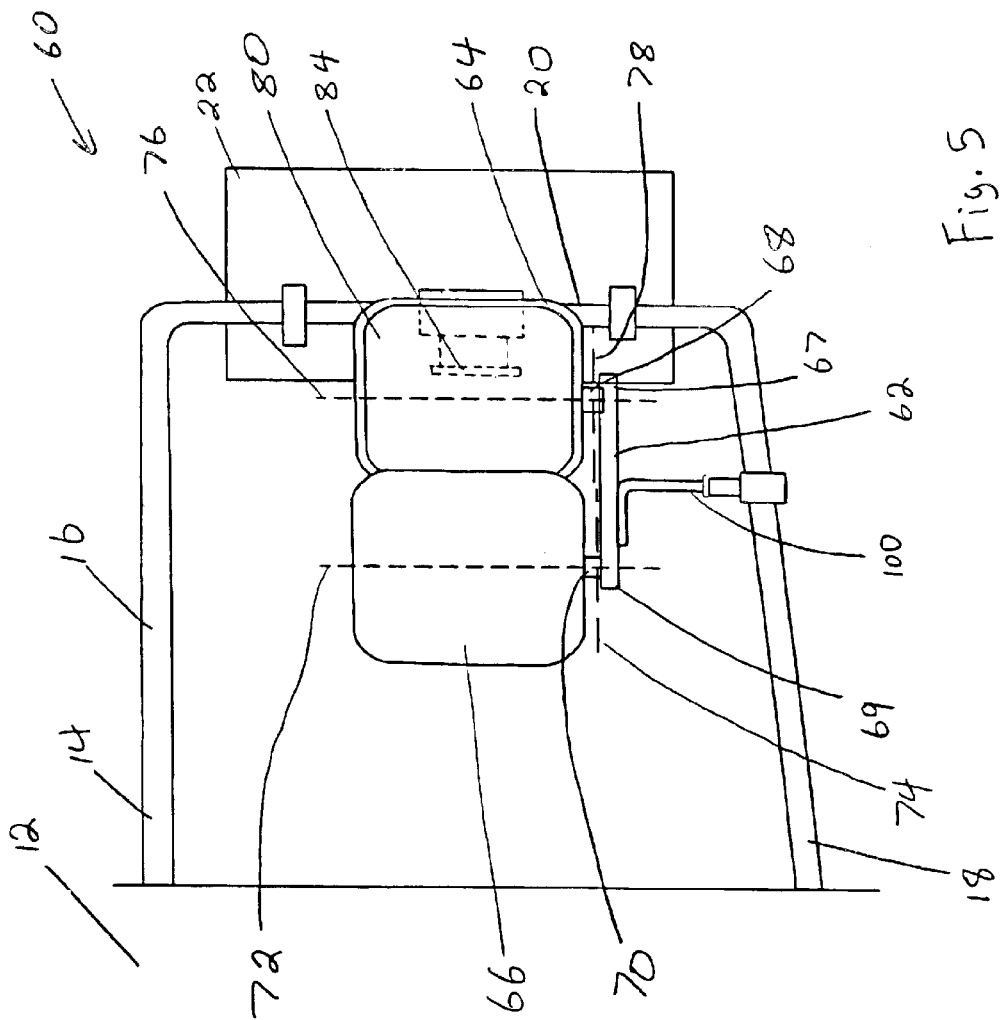
FIG. 5 is a front view of an alternate embodiment of the forward viewing mirror assembly.
Figure 9:
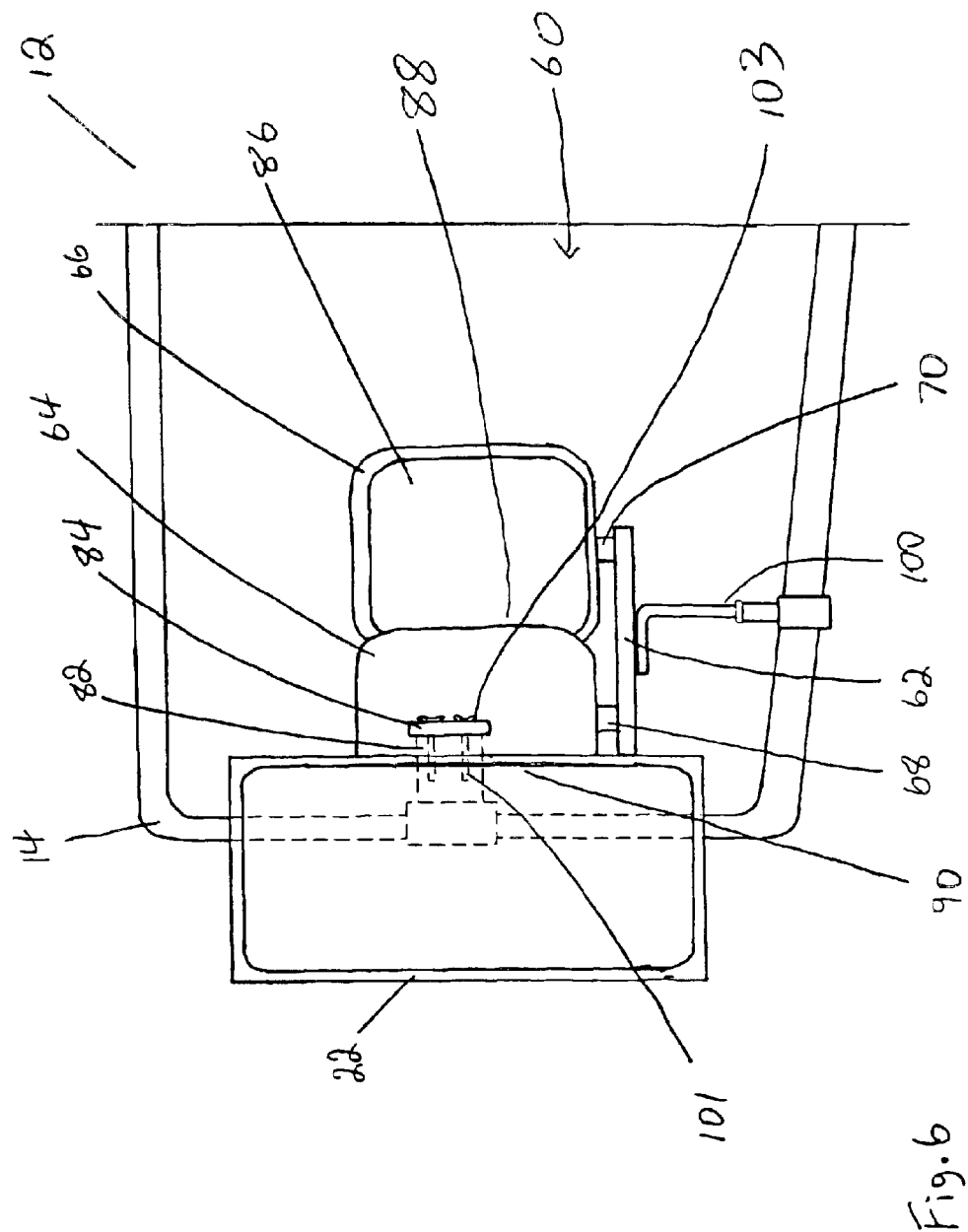

An alternate embodiment of the present invention is shown in FIG. 5. It consists of forward looking mirror 64, viewing mirror 66, and support 62. Support 62 preferably consists of an elongated bar having opposite ends 67 and 69. Forward looking mirror 64 is pivotally mounted to end 67 by ball and socket joint member 68. Likewise, viewing mirror 66 is pivotally mounted to end 69 of support 62 via ball and socket joint 70. Ball and socket joint 70 permits mirror 66 to pivot along vertical axis 72 and horizontal axis 74. Likewise, ball and socket member 68 permits mirror 64 to tilt relative to vertical axis 76 and horizontal axis 78. Mirror 64 has reflective surface 80 which gathers an image from the front of truck 12 and reflects it to viewing mirror 66. Mirror 64 is mounted to yoke 14 via adjustable arm 82 and Telescoping arm 100. Arm 82 is in turn mounted to portion 20 of yoke 14. Adjustable arm 82 is mounted to adjustable bracket 84. Adjustable bracket 84 and adjustable arm 82 permit mirror assembly 60 to be positioned such that the image reflected from mirror 66 is at the driver's eye level. Telescoping arm 100 reduces any vibration in the mirrors while the vehicle is operating.

Referring now to FIG. 6, the back of mirror 64 is provided with adjustable bracket 84 which permits mirror 64 to be attached to the end of adjustable arm 82. The length of adjustable arm 82 can be adjusted to position mirror 64 in the correct position required to reflect an image to mirror 66. Arm 82 has elongated slots 101 which are configured to receive connecting bolts 103. Connecting bolts 103 are configured to mount arm 82 to bracket 84. Connecting bolts 103 can be loosened to permit arm 82 to be adjusted relative to bracket 84. When bolts 103 are tightened, they rigidly secure arm 82 to bracket 84. As in the previous embodiment, mirror 66 is provided with a reflective surface 86 which displays the forward view gathered by mirror 64. As in the previous embodiment, mirror surface 86 is positioned at a distance from rear view mirror 22 such that the driver cannot focus on the image in rear view mirror 22 and mirror 66 simultaneously. For most practical applications, it has been discovered that if the outer edge 88 of reflective surface 86 of mirror 66 is more than 4 inches from inner edge 90 of mirror 22, then the driver will not be able to focus on the images in mirror 66 and 22 simultaneously. Since a driver cannot focus on the different images from mirror 66 and 22 simultaneously, the likelihood of the driver confusing one mirror from the other is greatly reduced.

The mounting system of the alternate embodiment shown in FIGS. 5 and 6 permit a much less expensive mirror assembly. By mounting mirrors 66 and 64 on top of support 64 via ball and socket connectors 70 and 68, respectively, a simplified mirror assembly is constructed. Essentially, the mirror assembly consists of only mirrors 66 and 64, support member 62, ball and socket connectors 68 and 70 and arms 100 and 82. Furthermore, by having both mirrors mounted on top of support member 62, mirrors 64 and 66 can reflect an image without any intervening support members getting in the way. By mounting mirror 64 directly to yoke 14 via adjustable arm 82, mirror assembly 60 can be very easily and quickly connected. Furthermore, since the length of adjustable arm 82 and telescoping arm 100 can be adjusted, mirror assembly 60 can be easily positioned in the desired location. Hence, mirror assembly 60 can be mounted directly to truck 12 simply by re-positioning telescoping arm 82 (on bracket 84) and by re-positioning stabilizer arm 100.

Figure 7:
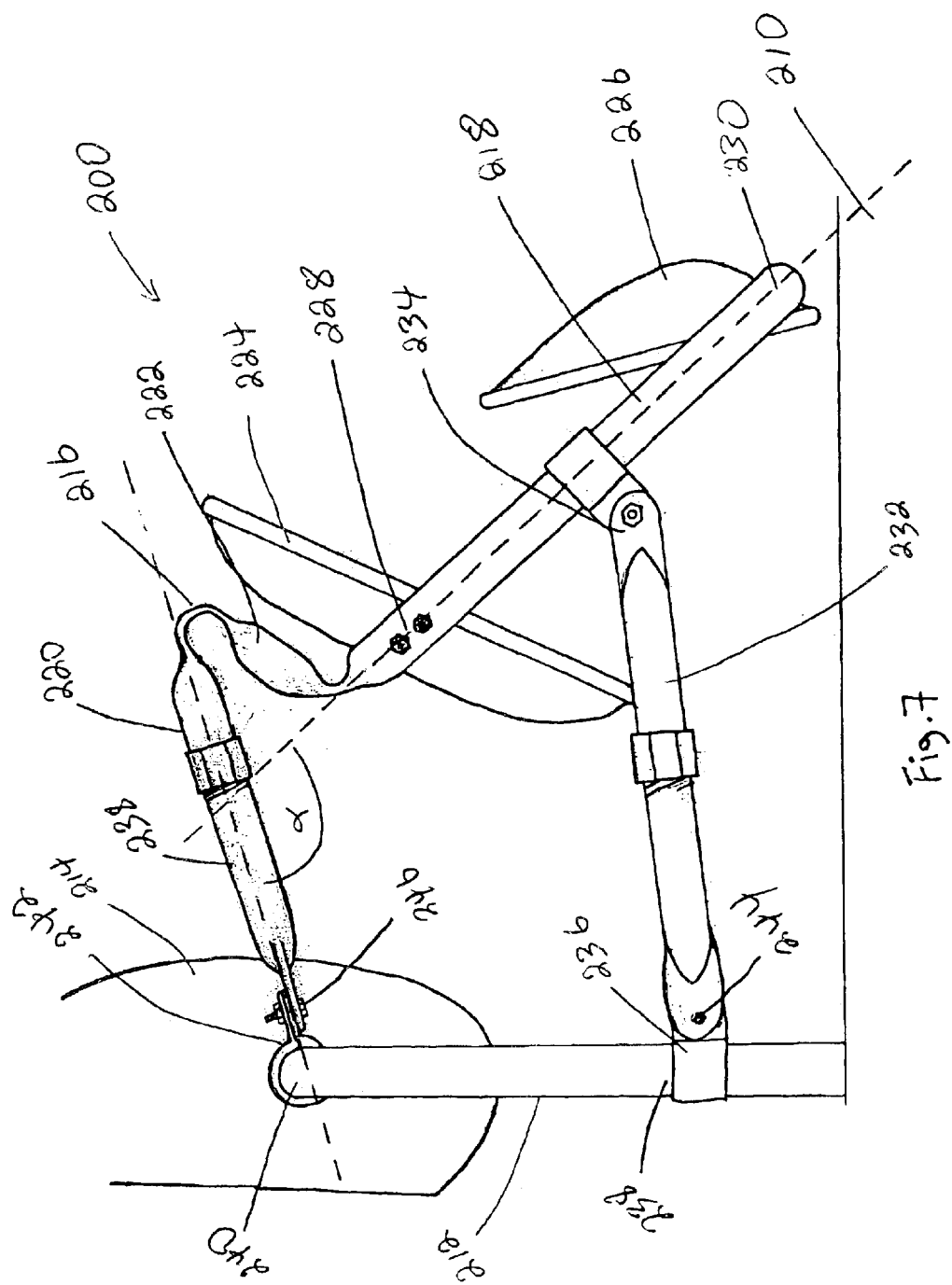
FIG. 7 is a top view of another alternate embodiment of the forward viewing mirror assembly.
Figure 8:
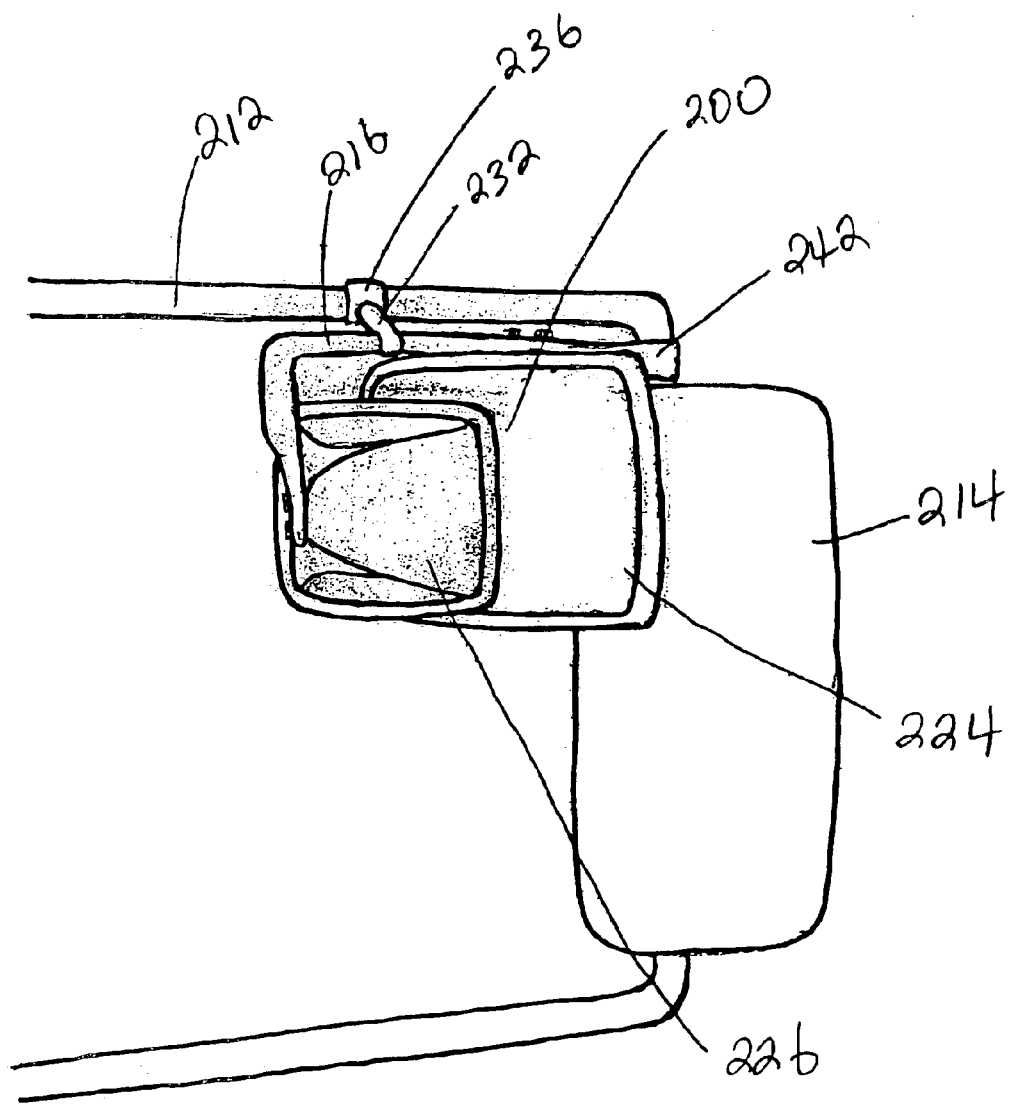
FIG. 8 is a front view of the embodiment shown in FIG. 7.

One of the drawbacks with previous forward looking mirror assemblies is the difficult installation that was often incumbent in their design. After the mirror assemblies were attached to the vehicle, the mirrors had to be adjusted until they were both in the proper orientation. This procedure was surprisingly time consuming and frustrating and the driver often required an assistant to position the mirrors while he or she remained in the vehicle in order to gauge when the mirrors where in the correct orientation. Furthermore, as the vehicle traveled, the mirrors were subjected to vibration and eventually fell out of proper alignment. This would require time consuming adjustments to both mirrors to place them back into proper alignment. Unfortunately, these adjustments required the operator to pull his or her vehicle over to the side of the road to make these adjustments. The alternate embodiment of the present invention as shown in FIGS. 7 and 8 overcomes these problems by mounting the mirrors in a fixed and rigid orientation. The mirrors are mounted in a frame like structure which places the mirrors in the correct orientation when the frame is mounted to the yoke of the vehicles rear view mirror without the need for time consuming adjustments to the mirrors.

Referring now to FIG. 7, an alternate forward viewing mirror assembly is shown generally as item 200 and consists of elongated bar 216, first mirror 224, second mirror 226 and connecting arm 232. Elongated bar 216 has first portion 218, second portion 220 and central portion 222. Elongated bar 216 preferably consists of an elongated metal tubular bar having a telescoping end 238 which is attachable to yoke 212. Mirror 224 is rigidly attached to first portion 218 at attachment point 228 by means known generally in the art. Mirror 226 is rigidly attached to first portion 218 at attachment point 230 by means known generally in the art. Connecting arm 232 has opposite ends 236 and 234 which are attachable to yoke 212 and first portion 218 of bar 216, respectively. Preferably, connecting arm 232 is telescoping. Mirrors 226 and 224 are mounted to first portion 218 such that mirror 224 collects an image from in front of truck 210 and reflects it to mirror 226, which in turn reflects the image to a driver (not shown) seated within truck 210. The dimensions of connecting arm 232 and bar 216 are selected to facilitate the placement of mirrors 224 and 226 in the perfect orientation for reflecting a forward image to the driver when assembly 200 is mounted to yoke 212.

End 234 is attachable to first portion 218 at a position between points 228 and 230. It has been discovered that attaching end 234 between points 228 and 230 permits mirrors 224 and 226 to be more rigidly secured to yoke 212 when assembly 200 is mounted, thereby reducing the amount of vibration in the mirrors when truck 210 is in motion. Mounting end 234 either towards portion 220 of bar 216 or at one of points 228 or 230 results in a less stable mounting of mirrors 224 and 226. To facilitate the correct orientation of mirrors 224 and 226, central portion 222 of bar 216 is configured such that portion 218 of bar 216 is at preselected angle a relative to portion 220 of bar 216. Preferably angle α is approximately 135°. It has been discovered that fixing portion 218 and 220 at an obtuse angle of approximately 135° relative to each other facilitates the quick and easy installation of assembly 200 by automatically positioning the mirrors in the correct orientation when assembly 200 is mounted to yoke 212. The mounting of mirror assembly 200 shall now be explained.

Assembly 200 is attached to yoke 212 at points 238 and 240. End 236 of arm 232 is adapted to be clamped to yoke 212 at point 238 by means known generally in the art. Preferably, end 236 is provided with a tightening bolt 244 to permit the end to be securely clamped onto the yoke. End 242 of arm 216 is also adapted to clamp to yoke 212 at point 240 by means known generally in the art. End 242 preferably includes tightening bolt 246 to ensure that end 242 tightly clamps onto the yoke. As best seen in FIG. 8, end 242 or member 216 is mounted to yoke 212 adjacent rear view mirror 214. Since mirrors 224 and 226 are already positioned relative to each other in the correct orientation, and since the dimensions of connector arm 232, and portions 218, 220 and 222 are selected to place the mirrors in the right orientation to reflect a forward view to the driver, adjusting the mirrors is not required. Fine adjustment to the assembly can be made by adjusting telescoping sections 238 and connector 232.

As in the previous embodiments, mirrors 226 and mirror 214 are separated by a distance sufficient to prevent the driver of the vehicle (not shown) from focusing on the images in both mirrors 226 and 214 simultaneously. However, since mirror 226 and 214 are mounted adjacent to one another, the driver can simply move his eyes slightly to focus on an image in either mirror 226 or 214. The dimensions of arm 232 and member 216 are selected to ensure that mirrors 226 and 214 are separated by the correct distance from each other.

Referring back to FIG. 1, many rear view mirror mounting yokes include both upper and lower horizontally extending arms 16 and 18, respectively. These upper and lower arms permit secure attachment of the forward looking mirror assembly by means of multiple attachment arms which can attach to either upper or lower arm. Unfortunately, many of the newer trucks on the road are not equipped with rear view mirror yokes as shown in FIG. 1. Many newer trucks use a single arm mounting yoke to mount the rear view mirror to the truck. The forward view mirror assembly shown in FIGS. 7 and 8 can be used with one armed rearview mirror mounting yokes since the rear view mirror assembly uses only two mounting arms positioned above the assembly.

While various embodiments of the present invention have been described above, it should be understood that they have been presented by way of example only, and not limitation. Thus, the breath and scope of the present invention should not be limited to any of the above described exemplary embodiments, but should be defined only in accordance with the following claims in their equivalents.

What is claimed is:

1. A mirror assembly for reflecting images forward of a vehicle to a driver within the vehicle, the vehicle comprising a rear view mirror and a U-shaped yoke that mounts the rear view mirror to the vehicle, the mirror assembly comprising:

a support;

a forward-looking mirror mounted to the support to gather an image forward of the vehicle;

a viewing mirror mounted to the support to reflect the image from the forward-looking mirror; and, mounting means for mounting the support to the yoke, the mounting means comprising adjustment means for adjusting the position of the support relative to the yoke thereby to position the viewing mirror relative to the level of the driver's eyes.

2. The mirror assembly of claim 1 in which the adjustment means comprise an adjustable arm extending between the yoke and the support and having an adjustable length.

3. The mirror assembly of claim 2 comprises means mounting the forward-looking mirror and the viewing mirror to the support for pivoting about respective vertical pivot axes.

4. The mirror assembly of claim 1 comprising a wind screen mounted to the support forward of the viewing mirror and configured to deflect air flows away from the forward-looking arid viewing mirrors as the vehicle travels forward.

5. The mirror assembly of claim 1 in which the yoke comprises an upper horizontal member and a lower horizontal member, the mounting means comprising:

an adjustable arm with a pair of ends, the adjustable arm extending between the upper and lower horizontal members of the yoke and having an adjustable length; and, means releasably securing each of the ends of the adjustable arm to a different one of the horizontal members.

6. The mirror assembly of claim 5 comprises means mounting the forward-looking and viewing mirrors to the support for pivoting around respective vertical pivot axes.

7. The mirror assembly of claim 1 in which the yoke comprises an upper horizontal member, a lower horizontal member, and a vertical member to which the rear view mirror is mounted, the adjustment means comprising an adjustable arm extending between the support and one of the upper and lower horizontal members.

* * * * *